(12) United States Patent
Connell et al.

(10) Patent No.: US 9,640,100 B2
(45) Date of Patent: May 2, 2017

(54) DISPLAYING ALWAYS ON DISPLAY-RELATED CONTENT

(71) Applicant: Google Technology Holdings LLC, Mountain View, CA (US)

(72) Inventors: Nathan M. Connell, Hawthorn Woods, IL (US); Parikshit Dharawat, Sunnyvale, CA (US); Christian L. Flowers, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 236 days.

(21) Appl. No.: 14/460,546

(22) Filed: Aug. 15, 2014

(65) Prior Publication Data
US 2016/0049106 A1    Feb. 18, 2016

(51) Int. Cl.
| | | |
|---|---|---|
| G06F 17/00 | (2006.01) | |
| G09G 3/20 | (2006.01) | |
| G06F 1/32 | (2006.01) | |
| G06F 17/24 | (2006.01) | |
| G06F 17/30 | (2006.01) | |
| G09G 5/36 | (2006.01) | |

(52) U.S. Cl.
CPC ............ *G09G 3/20* (2013.01); *G06F 1/3206* (2013.01); *G06F 1/3265* (2013.01); *G06F 1/3293* (2013.01); *G06F 17/24* (2013.01); *G06F 17/30905* (2013.01); *G09G 5/363* (2013.01); *G09G 2310/0213* (2013.01); *G09G 2310/04* (2013.01); *G09G 2330/021* (2013.01); *G09G 2330/023* (2013.01); *G09G 2340/0407* (2013.01); *G09G 2360/144* (2013.01); *Y02B 60/121* (2013.01); *Y02B 60/1242* (2013.01)

(58) Field of Classification Search
CPC ...... G06F 17/21; G06F 7/24; G06F 17/30905; G06F 1/3265; G06F 3/3406; G06F 3/3466; G06F 3/20; G06F 3/3265; G06F 1/3206; G06F 1/3293; G09G 3/20; G09G 2360/144; G09G 2330/021; G09G 2310/04; G09G 2330/023; G09G 2340/0407; G09G 2310/0213; G09G 5/363; G06T 5/00; G06T 2207/20172; Y02B 60/121; Y02B 60/1242

USPC .......................................... 715/273; 345/428

See application file for complete search history.

(56) References Cited

U.S. PATENT DOCUMENTS

| | | |
|---|---|---|
| 8,233,000 B1 | 7/2012 | Diard |
| 2007/0222733 A1 | 9/2007 | Ju et al. |

(Continued)

OTHER PUBLICATIONS

International Search Report and Written Opinion correlating to PCT/US2015/044481 dated Oct. 23, 2015, 14 pages.

(Continued)

*Primary Examiner* — Quoc A Tran
(74) *Attorney, Agent, or Firm* — Shumaker & Sieffert, P.A.

(57) ABSTRACT

Systems and methods for displaying always-on content on a display of a mobile device allow the device to use a low power processor for certain always-on content and to coordinate with the device application processor for the remaining always-on content. In an embodiment, a pixel row-skip pattern is specified by the low power processor based on the display screen's resolution setting as well as ambient light conditions. In a further embodiment, the execution of pixel rendering in keeping with the prescribed pattern is synchronized between the device's low power processor and main application processor.

21 Claims, 8 Drawing Sheets

(56) References Cited

U.S. PATENT DOCUMENTS

| | | | |
|---|---|---|---|
| 2009/0210441 A1* | 8/2009 | Mercer | G06F 17/30905 |
| 2010/0320919 A1 | 12/2010 | Gough et al. | |
| 2012/0293568 A1 | 11/2012 | Todorovich | |
| 2014/0085274 A1 | 3/2014 | Lewis | |
| 2014/0118272 A1 | 5/2014 | Gunn | |
| 2014/0132158 A1* | 5/2014 | Land | G09G 3/20 |
| | | | 315/152 |
| 2014/0232722 A1* | 8/2014 | DeLuca | G09G 5/14 |
| | | | 345/428 |

OTHER PUBLICATIONS

International Preliminary Report on Patentability from International Application No. PCT/US2015/044481, mailed Mar. 2 2017, 11 pp.

* cited by examiner

DISPLAYING ALWAYS ON DISPLAY-RELATED CONTENT

TECHNICAL FIELD

The present disclosure is related generally to low power device operation, and, more particularly, to a system and method for displaying always-on content in a device having a low power processor.

BACKGROUND

Mobile communication devices have become so powerful that they have displaced many traditional devices. For example, users of mobile devices now often utilize the device as a clock or watch rather than carrying a separate traditional watch. As mobile communication devices take over the functions of other devices, however, the frequency with which users view their device screens has surged. For example, a user in a theater may pull out his or her mobile communication device several times during the movie to check the time of day.

Frequent use such as this can cause a power drain on the device's power source, e.g., its battery. At the same time, display-based techniques for conserving power have the potential to negatively impact the display appearance to the user.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

The present disclosure is directed to a system that may eliminate some of the shortcomings noted in the Background section. It should be appreciated however that any such benefit is not necessarily a limitation on the scope of the disclosed principles or of the attached claims, except to the extent expressly noted in the claims. Before presenting a detailed discussion of embodiments of the disclosed principles, an overview of certain embodiments is given to aid the reader in approaching the later discussion. As noted above, as the use of mobile communications devices in lieu of traditional devices increase, the power drain of such devices can become substantial, especially if a device were to implement an always on display.

Always on display is a display mode wherein the display is always on and viewable for reference, e.g., as a clock. However, because display tasks are power intensive, a low power processor is used for display tasks in the always-on mode. In an embodiment of the disclosed principles, while a mobile device is operating in the low power mode, the device's low power processor senses certain triggering events and displays (draws to the device display) specific pieces of content (hereinafter referred to as the first subset of always on-related content) via the device's display screen. Additionally, the device's application processor is used to display, via the device's display screen, specific pieces of content that are complementary to the first subset of always on-related content (hereinafter referred to as the second subset of always on-related content).

The approaching implementation of higher resolution display screens will lead to an increase in processing times associated with rendering and displaying of always on-related content by the devices' low power processor. This could, in turn, result in a degraded user experience. Various embodiments of the disclosed principles manipulate the resolution setting of the device display screens via context-aware means to enhance the rendering and displaying of always on-related content.

By way of example, the low power processor of the device may dynamically configure the pixel patterns to be rendered on a mobile device's display screen based on the display screen's resolution setting as well as on ambient light conditions. When using both the low power processor and the application processor, execution of the pixel rendering is synchronized, in an embodiment, between the low power processor and the application processor.

Thus, upon determining the resolution of its display screen as well as the ambient light level, a mobile communication device operating in accordance with an embodiment of the disclosed principles dynamically configures a specific geometrical pattern of pixels (such as alternate rows of pixels, etc.) to be skipped, as related to the rendering of the first subset of always on-related content by the low power processor. The same pattern is used by the device's application processor to render the second subset of always on-related content.

Turning now to a more detailed discussion in conjunction with the attached figures, techniques of the present disclosure are illustrated as being implemented in a suitable environment. The following description is based on embodiments of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that many other devices such as but not limited to laptop computers, tablet computers, personal computers, embedded automobile computing systems and so on may also be used.

Figure 1:
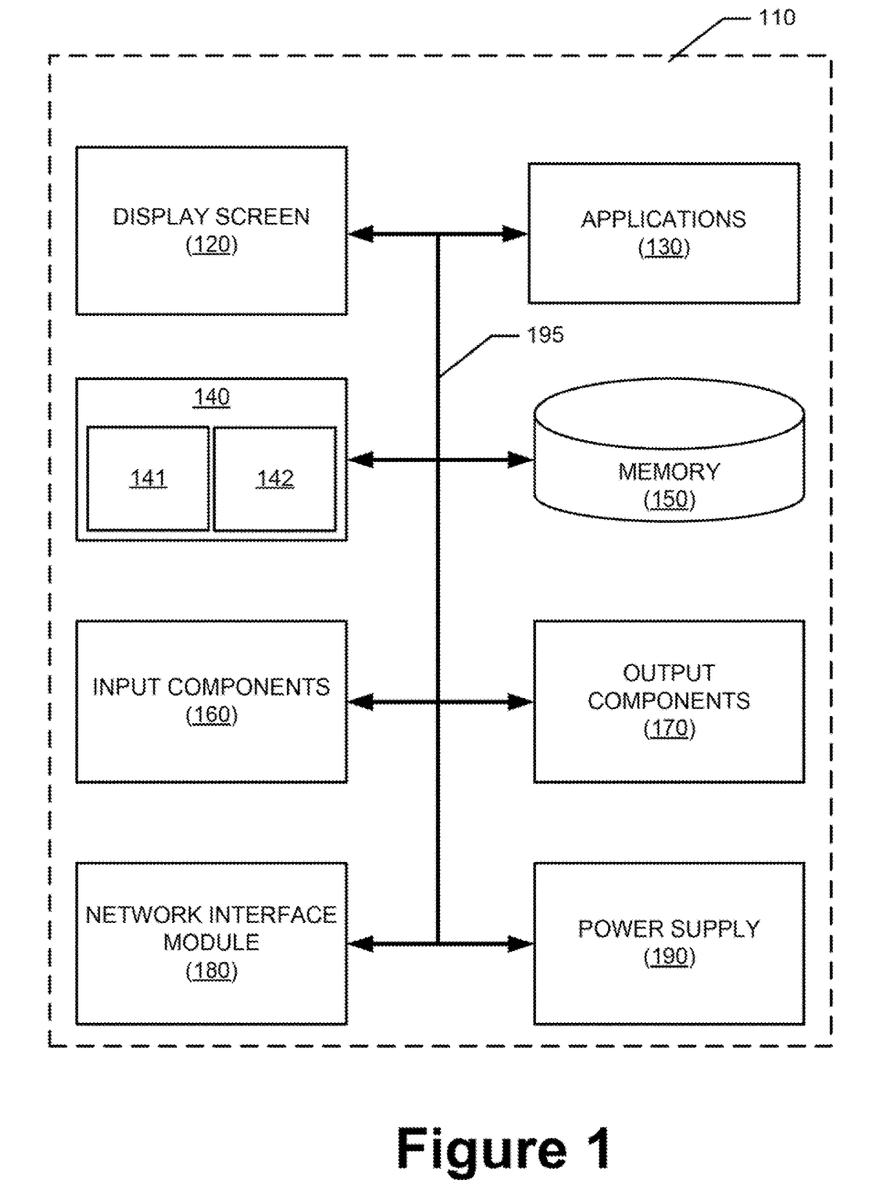
FIG. 1 is a generalized schematic of an example device with respect to which the presently disclosed innovations may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, cost, and other considerations.

In the illustrated embodiment, the components of the user device 110 include a display screen 120, applications 130, a processor 140, a memory 150, one or more input components 160 such as speech and text input facilities, and one or more output components 170 such as text and audible output facilities, e.g., one or more speakers.

The one or more input components 160 of the device 100 also include at least one sensor or system that measures or monitors environmental information associated with a current location of the device 100. The environmental information may include, for example, ambient light level, ambient noise level, voice detection or differentiation, movement detection and differentiation, and so on. Similarly, the device 100 may also include a sensor configured for determining location of the device such as a GPS module and associated circuitry and software.

The processor 140 can include any of a microprocessor, microcomputer, application-specific integrated circuit, or the like. For example, the processor 140 can be implemented by one or more microprocessors or controllers from any desired family or manufacturer. In an embodiment, the processor 140 includes two processors, i.e., a main or application processor 141 and a low power processor 142. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

The illustrated device 110 also includes a network interface module 180 to provide wireless communications to and from the device 110. The network interface module 180 may include multiple communications interfaces, e.g., for cellular, WiFi, broadband and other communications. A power supply 190, such as a battery, is included for providing power to the device 110 and its components. In an embodiment, all or some of the internal components communicate with one another by way of one or more shared or dedicated internal communication links 195, such as an internal bus.

Further with respect to the applications, these typically utilize the operating system to provide more specific functionality, such as file system service and handling of protected and unprotected data stored in the memory 150. Although many applications may govern standard or required functionality of the user device 110, in many cases applications govern optional or specialized functionality, which can be provided, in some cases, by third party vendors unrelated to the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device, or any of a variety of types of information that is uploaded to, downloaded from, or otherwise accessed at servers or other devices with which the device is in communication during its ongoing operation.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various icons that are linked to executable applications).

As noted above in overview, upon determining the resolution of its display screen as well as the ambient light level, a mobile communication device operating in accordance with an embodiment of the disclosed principles dynamically configures a specific geometrical pattern of pixels (such as alternate rows of pixels, etc.) to be skipped, as related to the rendering of the first subset of always on-related content by the low power microcontroller. Additionally, these same criteria can also be used by the device's application processor to render the second subset of always on-related content that is complementary to the first subset of always on-related content.

The geometrical pattern of pixels may be periodic and may include any specific pattern and period. For example, the geometrical pattern of pixels may be an equally alternating pattern (e.g., a repeating pattern of one on and one off), a ⅔ off pattern (e.g., a repeating pattern of one on and two off) or a ⅔ on pattern (e.g., a repeating pattern of one off two on).

Figure 2A:
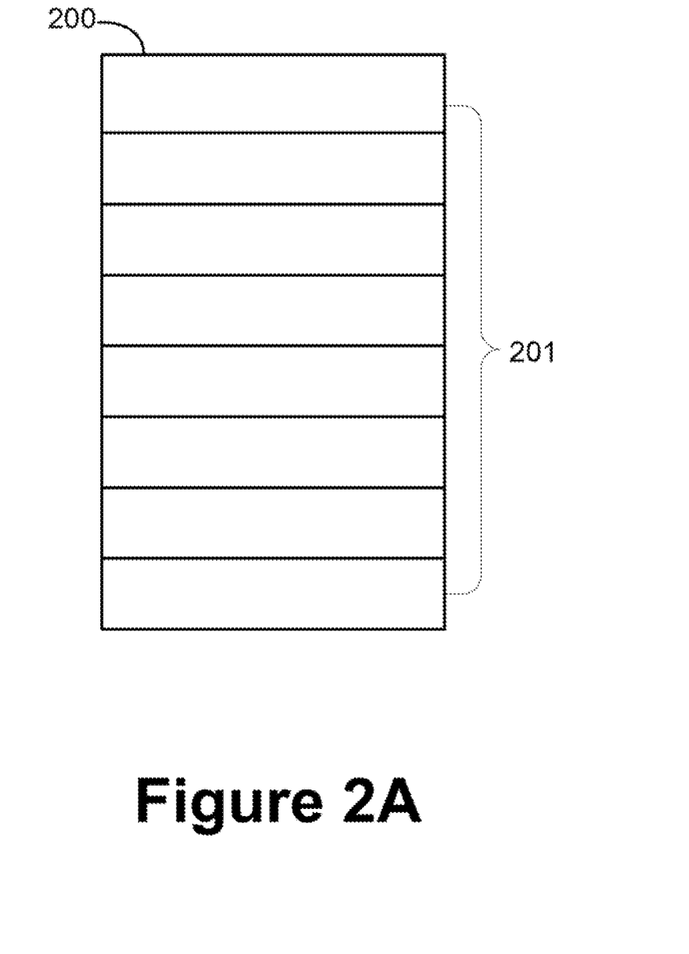
FIG. 2A is a simplified display pixel row diagram showing rows of pixel wherein all rows are active.

The simplified display pixel row diagram of FIG. 2A shows a display with a screen resolution setting corresponding to a low resolution setting with high ambient light. The display area 200 includes a number of pixel rows 201. In the illustrated example, in keeping with the low resolution setting and high ambient light, all pixel rows 201 are active, and the display is at a low brightness setting.

Figure 3:
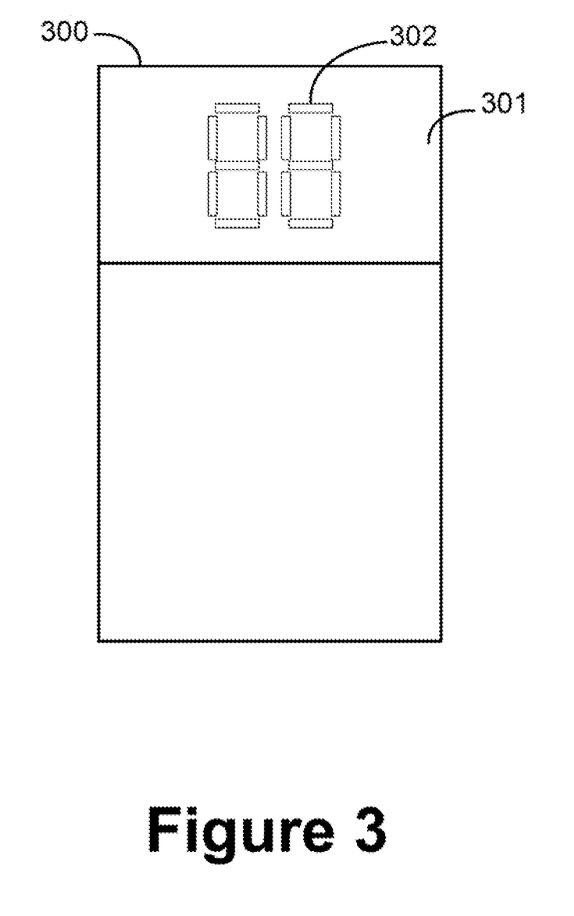
FIG. 3 is a simulated display on a device screen with a portion of the display certain area in an always-on configuration.

The display area 200 may represent an entire display or, alternatively, an always-on portion of a larger display. For example, on a device screen showing a display such as the simulated display 300 shown in FIG. 3, a certain area 301 may be always-on. That is, the always on portion may be actively updated as data displayed or represented in that area 301 changes. Thus, for example, the time of day 302 is an element that may be displayed in the always on portion 301 of the display 300.

Figure 2B:
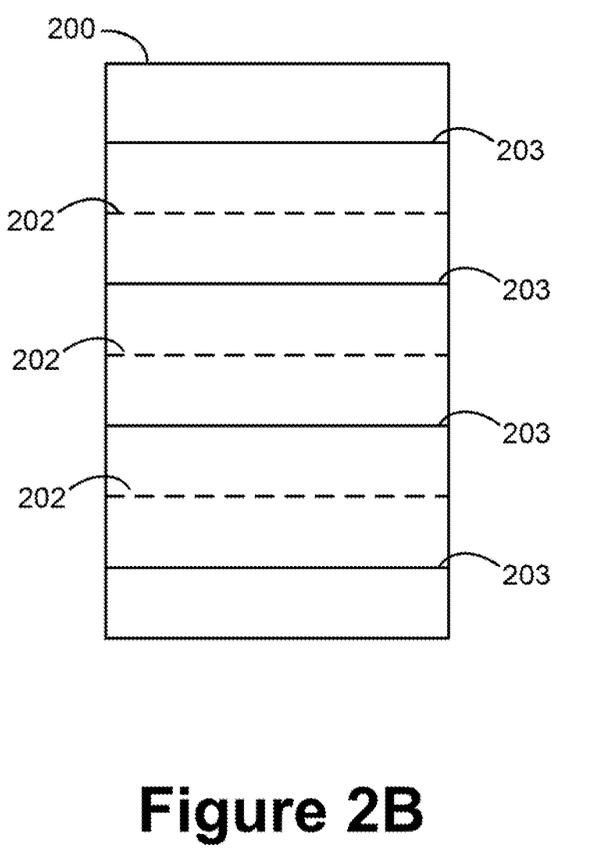
FIG. 2B is a simplified display pixel row diagram showing rows of pixel wherein alternative rows are inactive in accordance with an embodiment of the disclosed principles.

Returning to the prior figures and in particular FIG. 2B, the illustrated simplified display pixel row diagram of FIG. 2B shows a display with a screen resolution setting corresponding to a midrange screen resolution setting with high ambient light. The display area 200 includes a number of pixel rows. In the illustrated example, in keeping with the midrange screen resolution setting and high ambient light, certain rows of pixels 202 are skipped while other pixel rows 203 are active. In particular, every other pixel row is skipped. In this configuration, the display brightness setting is higher than in the example of FIG. 2A.

Figure 2C:
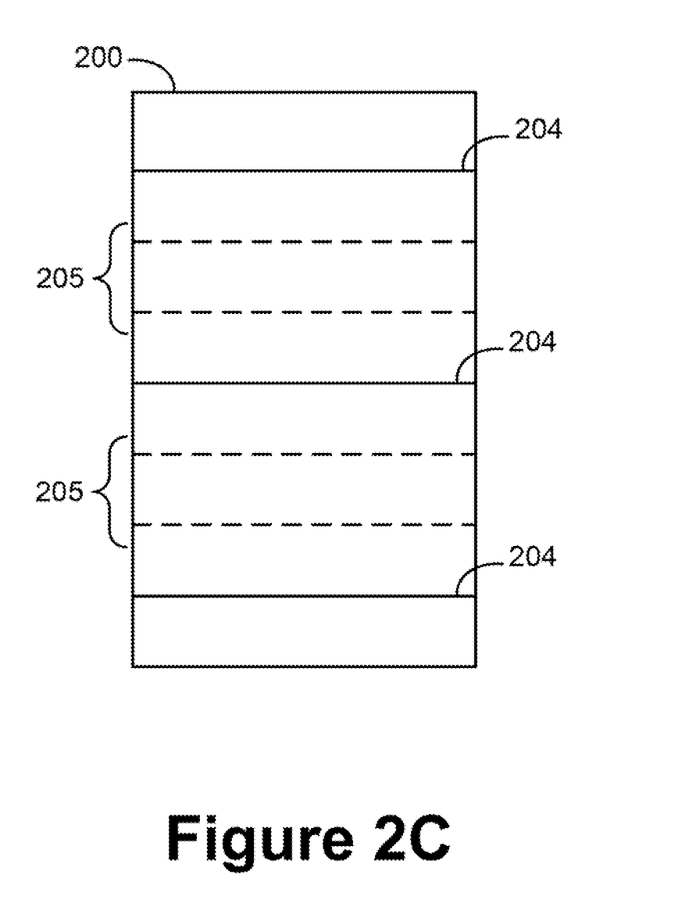
FIG. 2C is a simplified display pixel row diagram showing rows of pixel wherein only every third row is active in accordance with an embodiment of the disclosed principles.

While FIGS. 2A and 2B show active pixel row patterns for high ambient light conditions when using low resolution settings and midrange resolution settings respectively, FIG. 2C shows an active pixel row pattern for high ambient light conditions when using high resolution settings. As compared to the active pixel row pattern of FIG. 2B, an increased number of rows of pixels are skipped in the active pixel row pattern of FIG. 2C. In particular, the active pixel row pattern shows only every third pixel row 204 being active, with all other pixel rows 205 being skipped. Moreover, the display brightness setting is higher than that used in FIG. 2B.

As noted above, treating a portion of the display by strategically skipping pixel rows based on resolution and ambient light saves device power, which is generally useful and, as noted above, even more useful for devices supporting always on screen elements. In an implementation of the disclosed principles, further power savings are generated by using a low power processor to generate certain display elements and using the main application processor (high power processor) for selected tasks.

Figure 4:
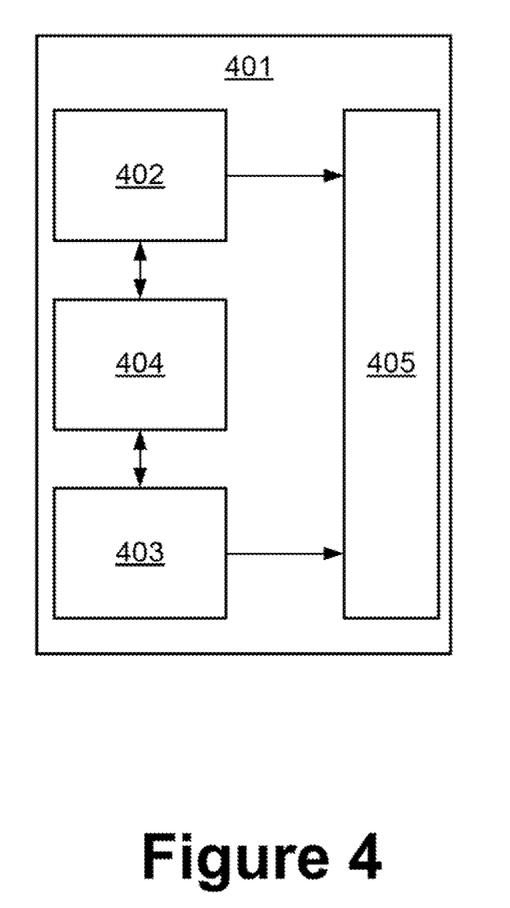
FIG. 4 is a simplified device hardware schematic of a device usable in accordance with various embodiments of the disclosed principles.

To better understand the division of roles between the low power and high power processors, FIG. 4 is a simplified device hardware schematic of a device 400 usable in accordance with various embodiments of the described principles. As shown, the device 401 (e.g., device 110 of FIG. 1 or similar) includes a display screen 405. In the illustrated example, the display screen 405 can be drawn (i.e., specified pixels can be written) by one or both of a low power processor 402 and an application processor (AP) 403, sometimes referred to herein as a high power or higher power processor.

Each processor 402, 403 has access to a device sensor hub 404, which may comprise a low power processor or microcontroller or may include a portion of the main application processor core. The device sensor hub 404 gathers data related to the device environment, e.g., ambient conditions such as ambient light levels, device location, and so on. Though not shown in the simplified view of FIG. 4, the device includes many other components that may be accessed and employed by the illustrated processors 402, 403. For example, each processor 402, 403 may use memory resources and networking and other communications resources.

When the device 401 is in a sleep or other low power mode but has certain always-on elements displayed, the low power processor 402 and device sensor hub 404 are active, and the low power processor 402 is responsible for a substantial amount of the task of drawing to the display 405. The low power processor 402 is slow relative to the application processor 403, and also has a lower level of memory resources, e.g., flash memory to be used while executing tasks such as drawing to the display 405.

Nonetheless, during times when the device 401 is asleep or in a low power mode, the user may expect a reasonable response time with respect to updated display-drawn elements. For example, if the device is in a low power mode, and the user pulls the device out of his or her pocket to check the time, there is no need to wake the device up. However, there is a need to update the time, and to display the updated time.

Figure 5:
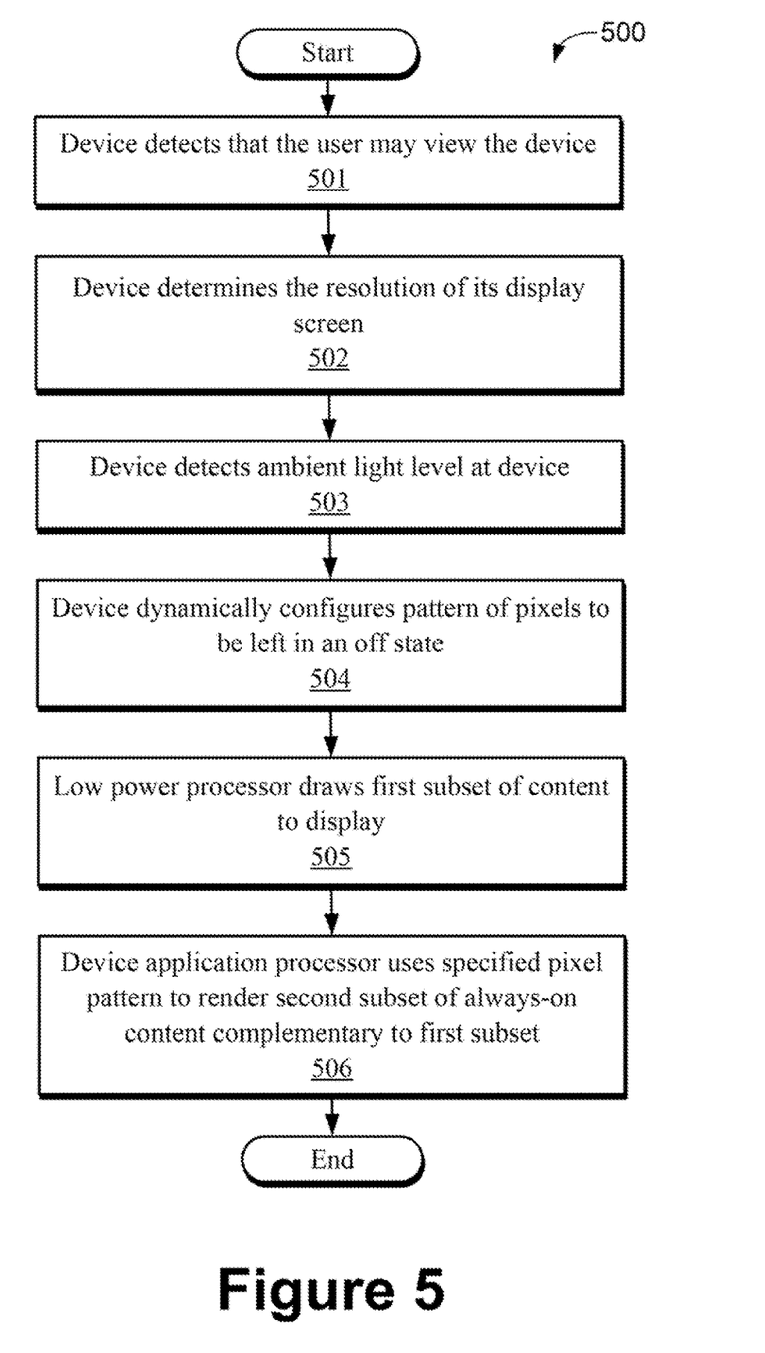
FIG. 5 is a flow chart showing an example process for updating at least a portion of a device screen with reduced resolution during a sleep mode or other low power mode in accordance with an embodiment of the disclosed principles.

Given the high resolution of modern devices such as mobile phones and smart phones, it is possible to reduce the resolution of the display or a portion thereof in order to save time and device power during redraw without visibly detracting from the user experience. In the example above, in the low power mode, only the digits or other indicator of time need to be redrawn and thus only the screen portion containing these pixels would have the pixel row skipping technique applied. In this case, skipping pixel rows allows for substantially reduced redraw times for frequently updated elements, while at the same time, allowing full or better resolution if desired for more detailed features While various methodologies may be employed to implement aspects of the disclosed principles, the flowchart of FIG. 5 shows an example process 500 for updating at least a portion of a device screen with reduced resolution during a sleep mode or other low power mode. In particular, the process 500 allows dynamic configuration of pixel patterns to be rendered on a mobile device's display screen based on the display screen's resolution setting as well as ambient light conditions.

The process 500 begins at stage 501, wherein the user of the device removes the device from a pocket or otherwise causes the device to generate an indicator that the user may view the device. At stage 502, the device determines the resolution of its display screen and at stage 503 the device detects an ambient light level, e.g., detecting a low ambient light level if the user is in a theater and a high ambient light level if the user is outdoors on a bright day.

Based on the resolution of the device display screen and the detected ambient light level, the device at stage 504 dynamically configures a specific pattern of pixels (such as alternate rows of pixels, every second and third row of pixels, and so on) to be left in an off state ("skipped") when rendering a first subset of content (always on content) by the low power microcontroller. Alternatively, the skipped pixels may be left active but not updated.

At stage 505 of the process 500, the device low power processor draws the first subset of content to the display. At stage 506, which may occur at any time after the execution of stage 504 to establish the specific pattern of pixels, the device application processor uses the specific pixel pattern prescribed in stage 504 to render the second subset of always-on content that is complementary to the first subset of always on-related content. By complementary, it is meant that the first and second subsets of always-on content, taken together, encompass substantially all content to be displayed in the always-on mode.

The low power processor and application processor are generally capable of operating independently. However, in an embodiment of the disclosed principles, the execution of pixel rendering as in process 500 is synchronized between the low power processor and the application processor.

Moreover, the low power processor may utilize additional resources other than the application processor to execute the actual pixel rendering in accordance with the specific pattern that the low power processor generated. Thus, for example, in an embodiment, the low power processor accesses the system kernel and directs it to draw certain display elements, e.g., a clock face. To efficiently utilize the kernel resources in this manner, the low power processor takes steps to ensure that the kernel is following the same order and phase as the low power processor with respect to row skipping.

Figure 6:
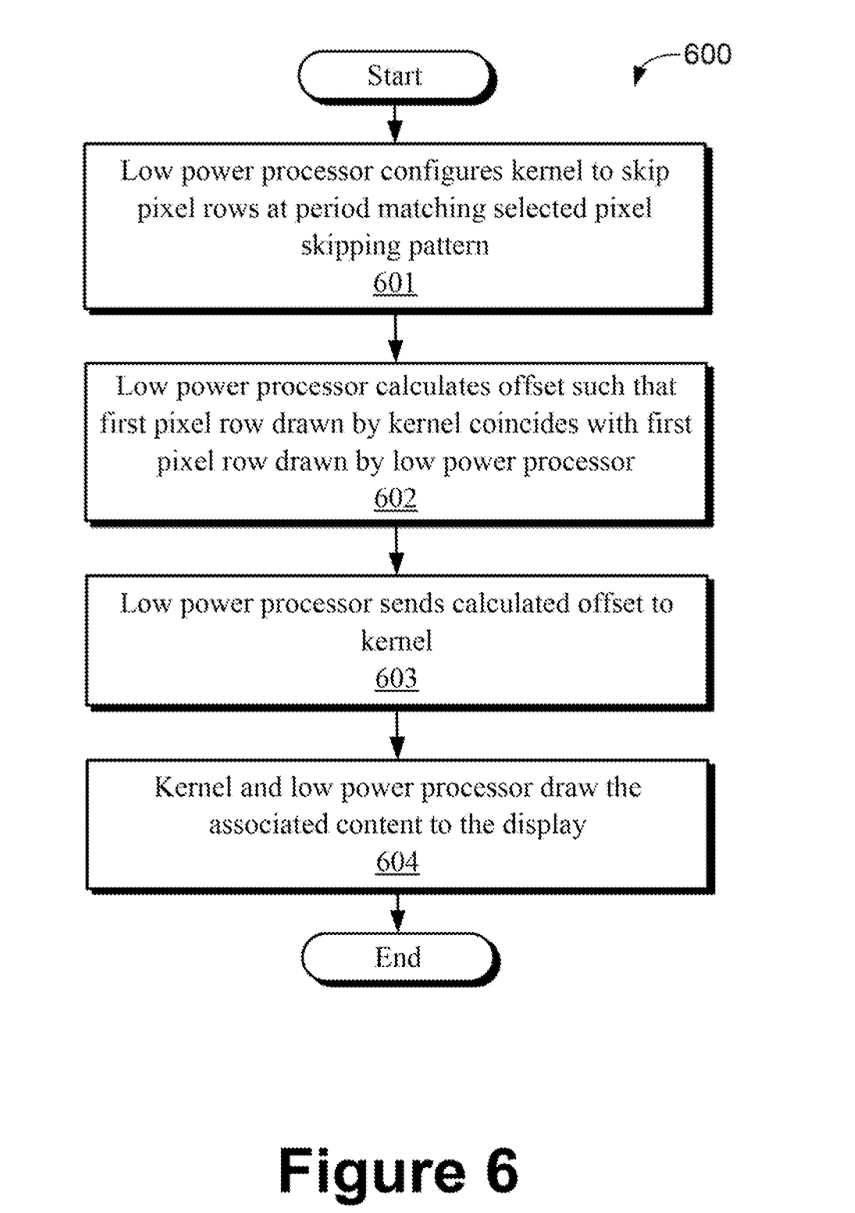
FIG. 6 is a flow chart showing an example process executed by the low power processor to ensure proper period and phase of kernel resources in accordance with an embodiment of the disclosed principles.

The flowchart of FIG. 6 shows a process 600 executed by the low power processor to ensure proper period and phase. At stage 601 of the process 600, the low power processor configures the kernel to skip pixel rows at a period matching the selected pixel skipping pattern. At this point, the skipping patterns of the low power processor and the kernel may be identical but out of phase. Thus, at stage 602, the low power processor calculates an offset such that the first pixel row drawn by the kernel coincides with the first pixel row drawn by the low power processor.

At stage 603 of the process 600, the low power processor sends the calculated offset to the kernel, and at stage 604, the kernel and low power processor draw the associated content to the display.

In a further embodiment of the disclosed principles, the low power processor is configured to guard against screen burn-in while displaying always on content. It will be appreciated that with respect to many types of displays, the physical display elements can exhibit changes in appearance related to the amount of on time and intensity during that on time.

This change in appearance typically becomes visible where fixed image elements are displayed, e.g., a clock frame, one or more fixed clock face numerals, a numerical clock minute/hour separator, date-separating slashes or dashes and so on. Thus, in an embodiment, the low power processor is configured to periodically change the phase of the pixel row skipping process, e.g., by starting with a skipped row rather than an active row, shifting the phase by one row every predetermined period, or otherwise.

When using additional system resources such as kernel resources, however, it is difficult for the low power processor to directly impose this shift. The low power processor may in effect cause such a shift without changing the pixel pattern executed by the kernel by indexing the starting row. Thus for example, if the kernel is configured to skip even rows and the low power processor has moved to skipping odd rows, it can change the starting row sent to the kernel from odd to even or vice versa to effectuate the same shift.

It will be appreciated from the foregoing that techniques and systems for displaying always-on content in a device having a low power processor have been disclosed. In view of the many possible embodiments to which the principles of the present disclosure may be applied, however, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   receiving, by a mobile communication device operating in a low-power mode, a triggering event signaling that content is to be output at a display of the mobile communication device, wherein the mobile communication device includes a low-power processor and an application processor;
   determining, by the mobile communication device, a resolution setting of the display;
   determining, by the mobile communication device, an ambient light level at the mobile communication device;
   generating, by the mobile communication device, based on the resolution setting of the display and the ambient light level at the mobile communication device, a geometrical pattern of display pixel rows to be skipped during output of the content;
   outputting, by the low-power processor of the mobile communication device, and for display at the display, a first subset of the content in accordance with the geometrical pattern of display pixel rows to be skipped; and
   outputting, by the application processor of the mobile communication device, and for display at the display, a second subset of the content in accordance with the geometrical pattern of display pixel rows to be skipped.

2. The method of claim 1, wherein the first subset of the content encompasses all of the content not encompassed in the second subset of the content.

3. The method of claim 1, wherein the content includes static content and dynamic content.

4. The method of claim 3, wherein the first subset of the content includes the static content and the second subset of the content includes the dynamic content.

5. The method of claim 1, wherein outputting the first subset of the content in accordance with the geometrical pattern of display pixel rows to be skipped includes instructing a system kernel to output at least a portion of the first subset of the content.

6. The method of claim 5, wherein instructing the system kernel to output at least the portion of the first subset of the content includes synchronizing a phase and a period of the geometrical pattern of display pixel rows to be skipped between the low-power processor and the kernel.

7. The method of claim 6, wherein synchronizing the phase and the period of the geometrical pattern of display pixel rows to be skipped between the low-power processor and the kernel includes providing an offset value from the low-power processor to the kernel.

8. The method of claim 1, further comprising generating a modification of the geometrical pattern of display pixel rows to be skipped.

9. The method of claim 8, wherein generating the modification of the geometrical pattern of display pixel rows to be skipped comprises offsetting the geometrical pattern of display pixel rows to be skipped by one row.

10. The method of claim 1, wherein the geometrical pattern of display pixel rows to be skipped is periodic and includes one of an equally alternating pattern, a ⅔ off pattern, or a ⅔ on pattern.

11. The method of claim 1, further comprising changing a brightness setting of the display based on a number of display pixel rows to be skipped in the geometrical pattern.

12. A mobile communication device, comprising:
    a light sensor configured to sense an ambient light level at the mobile communication device;
    a display;
    an application processor configured to operate the mobile communication device and to shift operation to a low-power mode; and
    a low-power processor configured to cause content to be output to the display during the low-power mode by being configured to:
       receive a triggering event signaling that the content is to be output to the display;
       determine a resolution setting of the display;
       determine an ambient light level at the mobile communication device using the light sensor;
       generate, based on the resolution setting and the ambient light level, a geometrical pattern of display pixel rows to be skipped during output of the content;
       output, for display at the display, a first subset of the content in accordance with the geometrical pattern of display pixel rows to be skipped; and
       cause the application processor to output, for display at the display, a second subset of the content in accordance with the geometrical pattern of display pixel rows to be skipped.

13. The mobile communication device of claim 12, wherein the content includes static content and updated content.

14. The mobile communication device of claim 13, wherein the first subset of the content includes the static content and the second subset of the content includes the updated content.

15. The mobile communication device of claim 12, wherein the low-power processor is configured to output the first subset of the content in accordance with the geometrical pattern of display pixel rows to be skipped at least by being configured to instruct a system kernel to output at least a portion of the first subset of the content.

16. The mobile communication device of claim 15, wherein the low-power processor is configured to instruct the system kernel to output at least the portion of the first subset of the content at least by being configured to synchronize a phase and a period of the geometrical pattern of display pixel rows to be skipped between the low-power processor and the kernel.

17. The mobile communication device of claim 16, wherein the low-power processor is configured to synchronize the phase and the period of the geometrical pattern of display pixel rows to be skipped between the low-power processor and the kernel at least by being configured to provide an offset value to the kernel.

18. The mobile communication device of claim 12, wherein the low-power processor is further configured to generate a modification of the geometrical pattern of display pixel rows to be skipped.

19. The mobile communication device of claim 18, wherein the low-power processor is configured to generate the modification of the geometrical pattern of display pixel rows to be skipped at least by being configured to offset the geometrical pattern of display pixel rows to be skipped by one row.

20. The mobile communication device of claim 12, wherein the geometrical pattern of display pixel rows to be skipped is periodic and includes one of an equally alternating pattern, a ⅔ off pattern, or a ⅔ on pattern.

21. A method comprising:
   determining, by a mobile communication device, that a first portion of content to be output at a display is dynamic content to be periodically modified and displayed while the mobile communication device is in a low-power mode;
   determining, by the mobile communication device, that a second portion of the content is static content to be displayed but not modified while the mobile communication device is in the low-power mode;
   determining, by the mobile communication device, a resolution setting of the display;
   generating, by the mobile communication device, based on the resolution setting, a geometrical pattern of display pixel rows to be skipped during output of the content;
   outputting, by a low-power processor of the mobile communication device, and for display at the display, the first subset of the content in accordance with the geometrical pattern of display pixel rows to be skipped; and
   outputting, by an application processor of the mobile communication device, and for display at the display, the second subset of the content in accordance with the geometrical pattern of display pixel rows to be skipped.

* * * * *